US009314006B2

(12) United States Patent
McLeod

(10) Patent No.: US 9,314,006 B2
(45) Date of Patent: Apr. 19, 2016

(54) REEL ASSEMBLY FOR STORING FISHING LINE

(71) Applicant: STRAIGHTSTICK LIMITED, Belize (BZ)

(72) Inventor: Alexander James Bentley McLeod, Grahamstown (ZA)

(73) Assignee: STRAIGHTSTICK LIMITED, Belizé (BZ)

( * ) Notice: Subject to any disclaimer, the term of this patent is extended or adjusted under 35 U.S.C. 154(b) by 464 days.

(21) Appl. No.: 13/856,549

(22) Filed: Apr. 4, 2013

(65) Prior Publication Data

US 2013/0264407 A1  Oct. 10, 2013

(30) Foreign Application Priority Data

Apr. 4, 2012 (ZA) .................................. 2012/02469

(51) Int. Cl.
*B65H 75/30* (2006.01)
*A01K 89/00* (2006.01)
*A01K 97/06* (2006.01)
*A01K 97/16* (2006.01)

(52) U.S. Cl.
CPC ............... *A01K 89/00* (2013.01); *A01K 89/003* (2013.01); *A01K 97/06* (2013.01); *A01K 97/16* (2013.01)

(58) Field of Classification Search
CPC ....... A01K 89/00; A01K 97/06; A01K 97/16; A01K 89/003

USPC ........ 242/395, 605, 400.1, 405, 405.1, 405.2, 242/405.3, 406, 588, 588.2, 588.3
See application file for complete search history.

(56) References Cited

U.S. PATENT DOCUMENTS

| 1,679,178 | A | * | 7/1928 | Shillman | ............... | G01B 3/1041 |
| | | | | | | 15/220.4 |
| 4,410,084 | A | * | 10/1983 | Ladner | .................. | B63B 35/815 |
| | | | | | | 206/408 |
| 5,494,204 | A | * | 2/1996 | Wang | ...................... | A47F 13/00 |
| | | | | | | 206/394 |
| 6,517,022 | B1 | * | 2/2003 | Bailey | .................. | B65H 5/4471 |
| | | | | | | 242/388.1 |

* cited by examiner

*Primary Examiner* — William A Rivera
(74) *Attorney, Agent, or Firm* — Ladas & Parry LLP

(57) ABSTRACT

A reel assembly 10 for storing fishing line 8 includes a housing comprising first and second housing parts 14, 16, a spool assembly 17 including a spool 38 rotatably mounted to the housing part 16 and a handle 39 removably mounted to the spool 38 for winding the line 8 onto the spool 38. The housing parts 14, 16 each have first and second complementary releasable connecting formations 20, 22 for releasably connecting the housing parts 14, 16 to one another in one of a housing configuration wherein the housing parts 14, 16 are releasably connected to one another by the formations 20 to form a housing around the spool 38 and a supporting configuration wherein the housing part 14 is releasably connected to an underside of the housing part 16 by the formations 22 such that the housing part 14 provides a stable base for supporting the housing part 16 on a substrate surface.

9 Claims, 12 Drawing Sheets

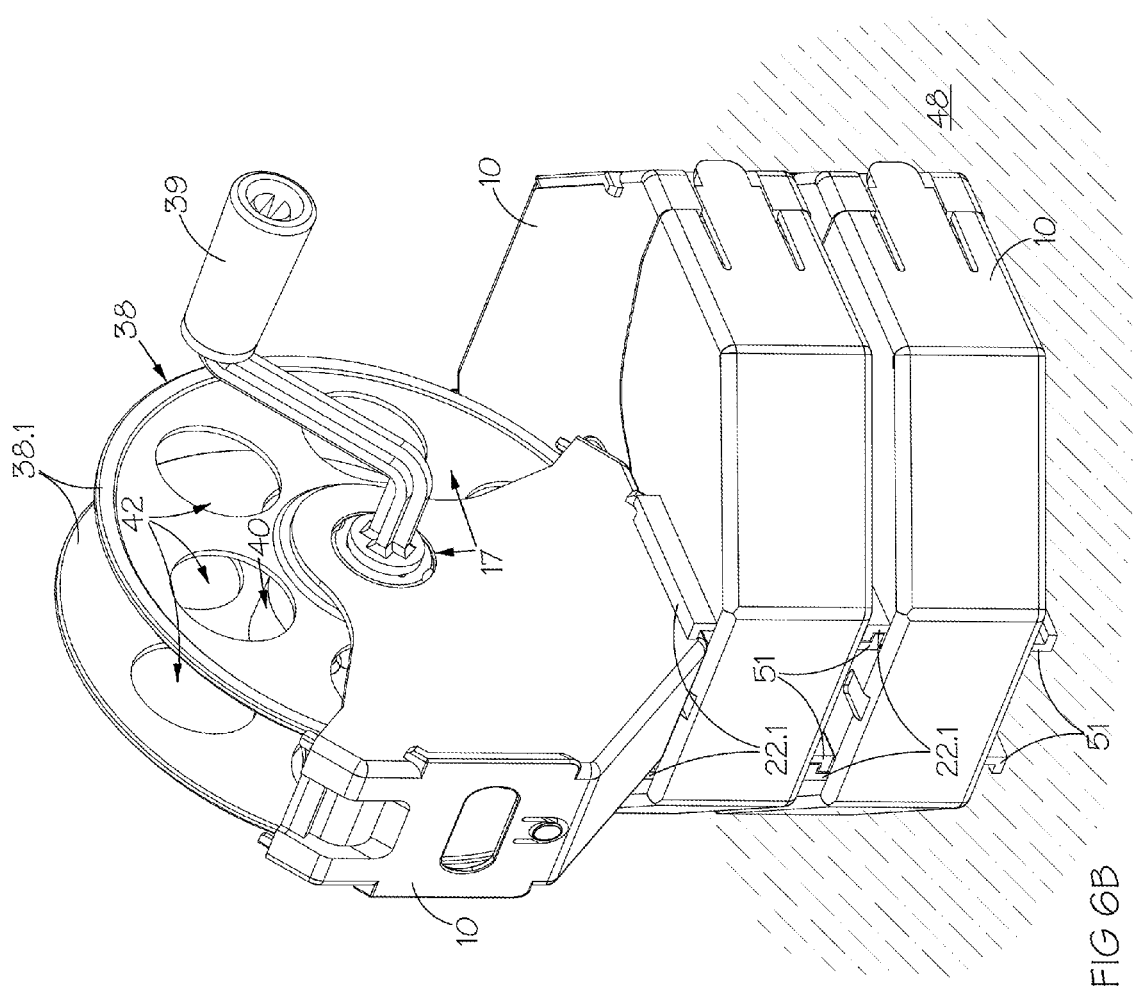

REEL ASSEMBLY FOR STORING FISHING LINE

FIELD OF INVENTION

This invention relates to a reel assembly for storing fishing line.

SUMMARY OF INVENTION

According to the invention there is provided a reel assembly for storing fishing line including:

a housing comprising a first housing part and a second housing part; and a spool rotatably mounted to the second housing part, the spool having a central support formation on which the fishing line can be wound, the spool defining an axis of rotation about which the spool is rotated for winding and unwinding the fishing line onto the spool, in use, the first housing part and the second housing part each having first and second complementary releasable connecting formations for releasably connecting the first housing part and the second housing part to one another in a selected one of:

a housing configuration wherein the first housing part and the second housing part are releasably connected to one another by the first connecting formations of the housing parts in an arrangement wherein the housing parts substantially surround the spool; and a supporting configuration wherein the first housing part is releasably connected to an underside of the second housing part by the second connecting formations of the housing parts, in an arrangement wherein the first housing part provides a base for supporting the second housing part on a substrate surface.

In use, when the housing parts are in the supporting configuration with the base of the first housing part placed into contact with the substrate surface, the base provides stability so as to stabilize the reel assembly against tipping forces acting on the reel assembly when a user exerts a pulling force on the fishing line when unwinding the fishing line from the spool, in use.

The reel assembly may include releasable locking means for releasably locking the housing parts to one another in the housing configuration.

One of the first housing part and the second housing part may include an aperture defined therethrough, through which the fishing line passes, in use.

Each housing part may have a generally cup-shaped configuration including a pair of opposite spaced apart major sides. The base of the first housing part may be defined by one of the major sides of the first housing part.

The reel assembly may have mounting means for mounting the housing to a housing of at least one similar reel assembly.

In a particular embodiment, the mounting means of the reel assembly may be in the form of a pair of mounting formations, each mounting formation of the pair of mounting formations, being located on a different one of two opposite sides of the housing for mounting a different one of a pair of similar reel assemblies to opposite sides of the housing.

In use, the mounting formations of the reel assembly permit the reel assembly to be connected to one or more similar reel assemblies in an arrangement wherein the reel assembly forms part of a reel set comprising said reel assembly and said one or more similar reel assemblies connected thereto. In use, the connection of the or each similar reel assembly to the reel assembly adds to the weight and size of the reel assembly. The reel set thus provides greater resistance to pulling forces exerted on the fishing line by a user when unwinding fishing line from the spool, in use.

The reel assembly may include cleaning means including at least one cleaning element for cleaning the fishing line; and a holder for holding the cleaning element, the holder being releasably attachable to the housing and having at least one passage extending therethrough for receiving the fishing line, the holder and the cleaning element being configured such that when the fishing line is drawn through the passage of the holder when winding the fishing line onto the spool, in use, the fishing line is brought into contact with the cleaning element for cleaning the fishing line.

The reel assembly may further include at least one spacer adapter which is releasably mountable to the spool, the spacer adapter providing a support structure which surrounds the central support formation of the spool and upon which the fishing line is wound, in use, for supporting the fishing line at positions spaced outwardly from the central support formation.

BRIEF DESCRIPTION OF THE DRAWINGS

The features of the invention are described hereinafter by way of a non-limiting example of the invention, with reference to and as illustrated in the accompanying schematic drawings. In the drawings:

FIG. 6B shows a perspective view of a part of the reel of FIG. 1, shown mounted to two other reel assemblies;

DETAILED DESCRIPTION OF THE DRAWINGS

Figure 1:
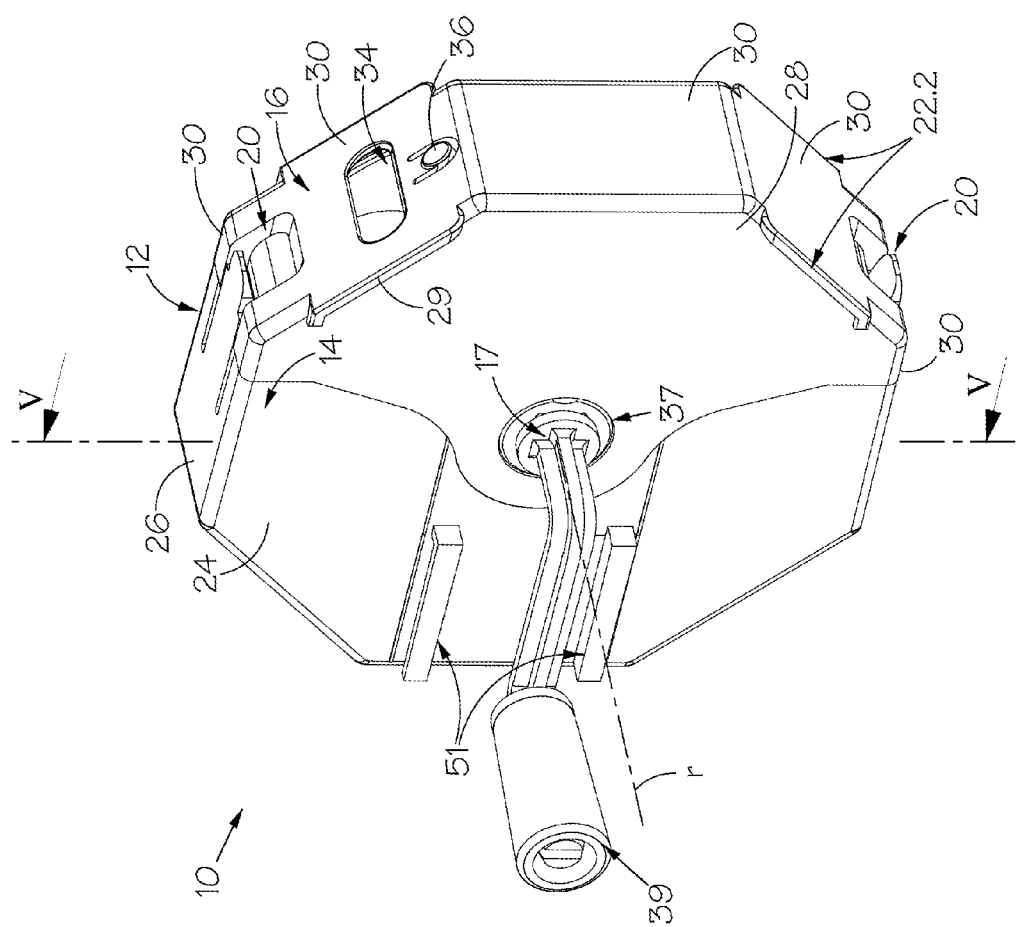
FIG. 1 shows a perspective view of a reel assembly in accordance with the invention, shown in a housing configuration of the reel assembly.

With reference to FIGS. 1 to 11 of the drawings, a reel assembly for storing fishing line, in accordance with the invention is designated generally by the reference numeral 10.

The reel assembly 10 is of a flexible moulded plastics material and is configured for storing fishing line 8. The reel assembly 10 includes a housing 12 comprising a first housing part 14 and a second housing part 16; a spool assembly 17 rotatably mounted to the second housing part 16; and mounting means in the form of a mounting system 19 (shown in FIG. 6A), the purpose of which will be explained in more detail hereinbelow.

The first housing part 14 has a generally cup-shaped body having a pair of opposite spaced apart major sides 24 and web formations 26 extending between the major sides 24. The second housing part 16 is similar in shape to the first housing part and has a generally cup-shaped body having a pair of opposite spaced apart major sides 28 and web formations 30 which extend between the major sides 28.

The second housing part 16 defines an aperture 34 therethrough, through which the fishing line 8 passes, in use; a pair of circular apertures 37 extending through the major sides 28 at positions opposite to one another; and releasable attaching formations 29, 36, the purposes of which will be explained in more detail below.

Figure 4:
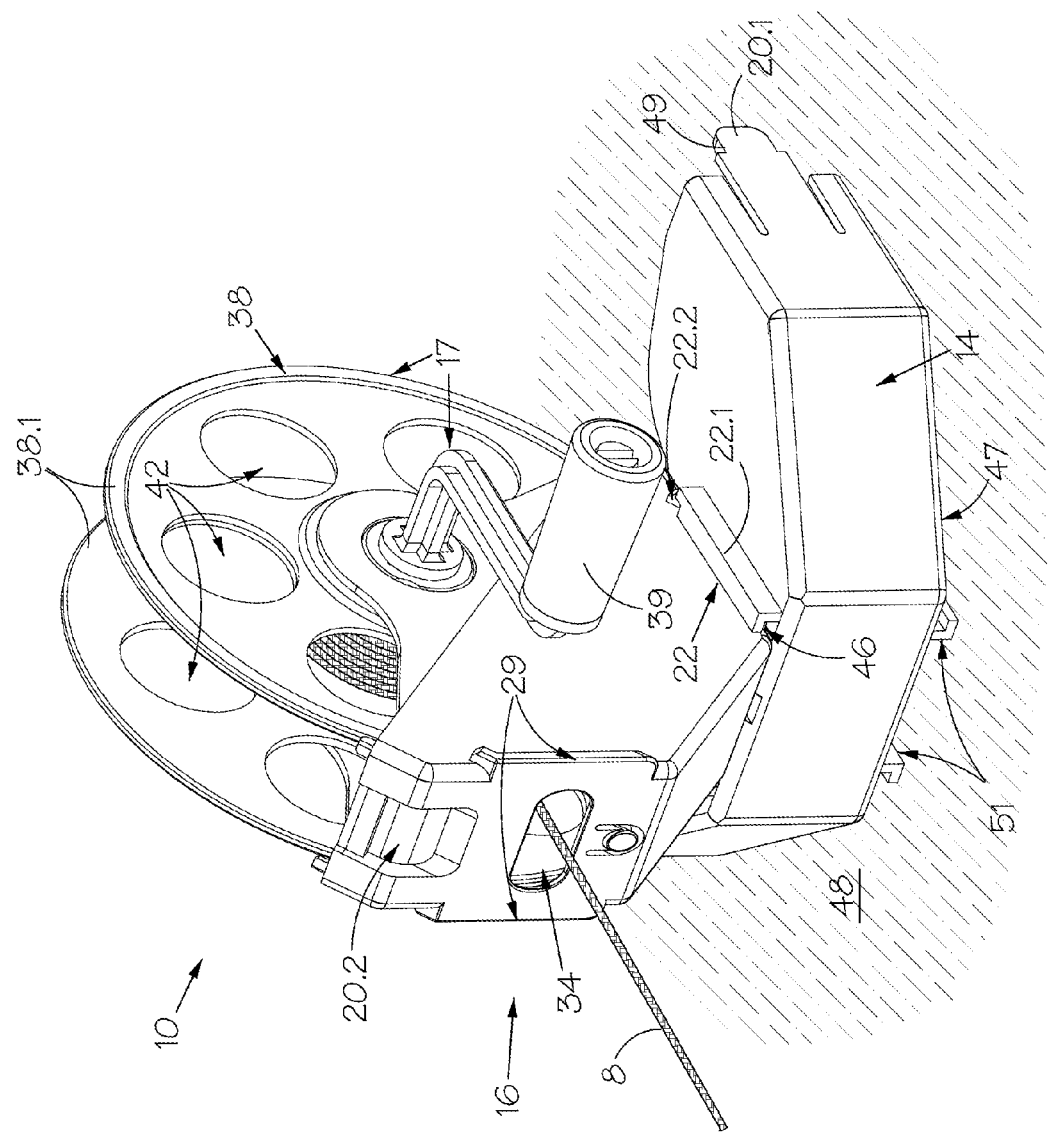
FIG. 4 shows a perspective view of the reel assembly of FIG. 1, shown in a supporting configuration of the reel assembly.

With specific reference to FIGS. 1 and 4 of the drawings, the first housing part 14 and the second housing part 16 have first complementary releasable connecting formations 20 and second complementary releasable connecting formations 22 for releasably connecting the first housing part 14 and the second housing part 16 to one another in a selected one of two different configurations, as illustrated in FIGS. 1 and 4 of the drawings and as will be explained in more detail hereinbelow.

The first connecting formations 20 of the housing parts 14, 16 are in the form of flexible projecting tongue formations 20.1 which project from opposite web formations 26 of the first housing part 14; and complementary slots 20.2 defined on opposite web formations 30 of the second housing part 16 within which the tongue formations 20.1 are slidably received.

The second connecting formations 22 of the housing parts 14, 16 are in the form of channel formations 22.1 defined on one of the opposite major sides 24 of the first housing part 14 and projecting rail formations 22.2 defined on opposite ends of a particular one of the web formations 30 of the second housing part 16 which are slidably received in the channel formations 22.1 as shown in FIG. 4 of the drawings.

The spool assembly 17 includes a spool 38 and a handle 39 which is removably mounted to the spool 38 and which can be manipulated by a user for winding and unwinding the fishing line 8 onto the spool 38, in use. The spool 38 includes two spaced side walls 38.1 and a central support formation in the form of a drum 40 which defines an axis of rotation "r" about which the spool 38 is rotatable and onto which the fishing line 8 is wound, in use; and a pair of mounting structures 44. The side walls 38.1 each have six circumferentially spaced apertures 42 defined therethrough, and a central aperture 43 defined therethrough, the purposes of which will be explained in more detail hereinbelow. The drum 40 has an aperture 41 defined therethrough and is rotatably mounted to the second housing part 16 by the pair of mounting structures 44 which are removably received through the pair of circular apertures 37 of the second housing part 16, as shown most clearly in FIGS. 2 and 5 of the drawings. As such, the pair of mounting structures 44 of the spool 38 may be removed from the pair of circular apertures 37 of the second housing part 16, when a user wishes to separate the spool 38 and the second housing part 16 from one another. The handle 39 has a forked end 45, the purpose of which will be explained hereinbelow.

The housing parts 14, 16 of the housing 12 are transformable, between a housing configuration as shown in FIG. 1 of the drawings and a supporting configuration as shown in FIG. 4 of the drawings. More particularly, when in the housing configuration, the first housing part 14 and the second housing part 16 are releasably connected to one another by the first connecting formations 20 of the housing parts 14, 16 in an arrangement wherein the housing parts 14, 16 form a housing around the spool 38, so as to substantially surround the spool 38. When in the supporting configuration, illustrated in FIG. 4 of the drawings, the first housing part 14 is releasably connected to an underside 46 of the second housing part 16 by the second connecting formations 22 of the housing parts 14, 16, in an arrangement wherein the first housing part 14 provides a stable base for supporting the second housing part 16.

More particularly, in use, when the housing parts 14, 16 are in the supporting configuration, the rail formations 22.2 of the second housing part 16, are slidingly received within the channel formations 22.1 defined on a particular major side 24 of the first housing part 14, for releasably connecting the first housing part 14 and the second housing part 16 to one another in the supporting configuration of the housing parts. The opposite major side 24 of the first housing part 14 provides a base formation 47 which is placed into contact with a substrate surface 48, when the housing parts in their supporting configuration are supported by the substrate surface 48.

In use, when the housing parts 14, 16 are in their supporting configuration with the base formation 47 of the first housing part 14 placed into contact with the substrate surface 48, the base formation 47 provides stability, so as to stabilize the reel assembly 10 against tipping forces acting on the reel assembly 10 when a user exerts pulling forces on the fishing line 8 when unwinding fishing line from the spool, in use.

Figure 6A:
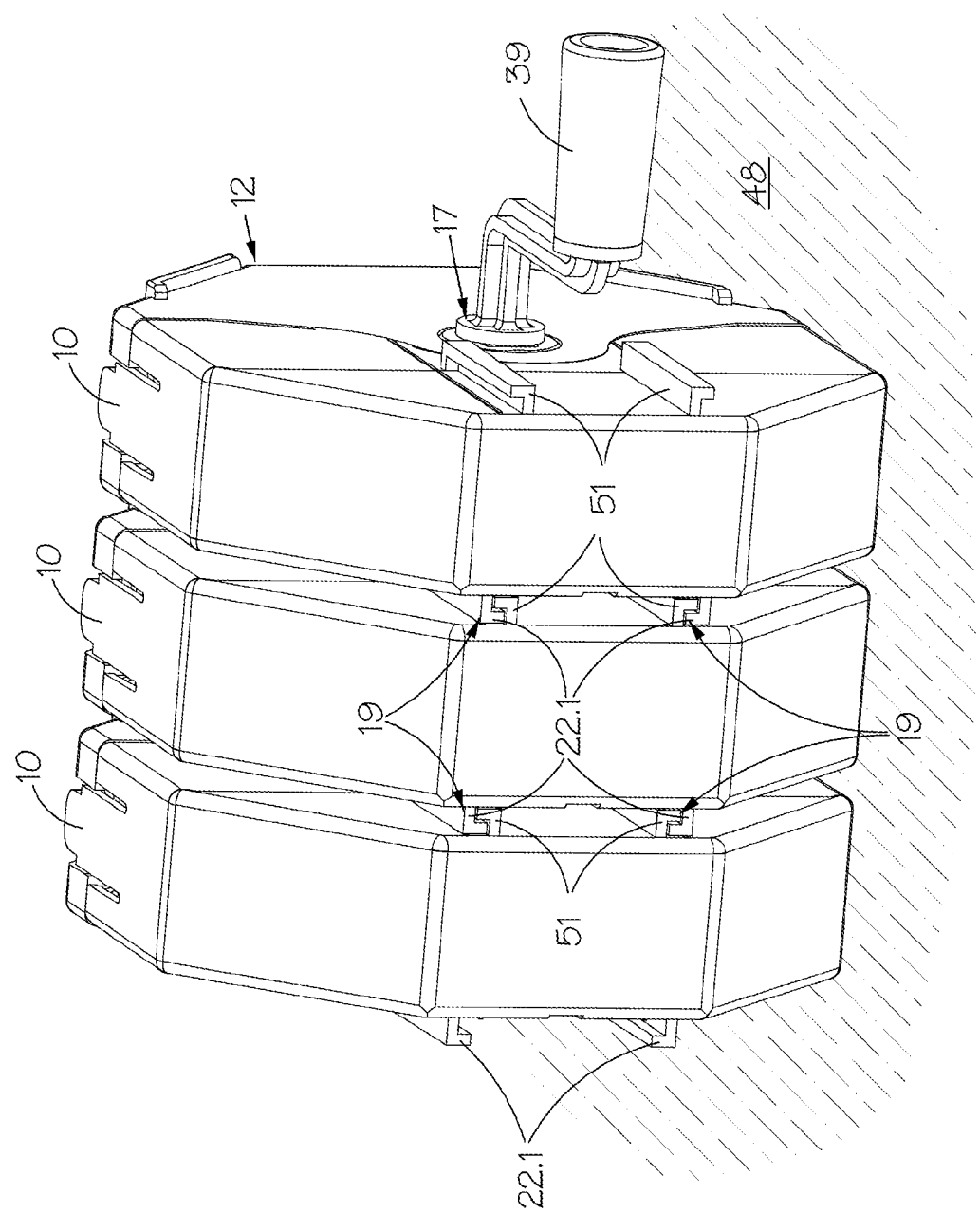
FIG. 6A shows a perspective view of the reel assembly of FIG. 1, shown mounted to two other similar reel assemblies.

With reference to FIG. 6A of the drawings the mounting system 19 includes the channel formations 22.1 and complementary channel formations 51 defined on the opposite major side 24 of the first housing part 14. The channel formations 22.1 and the complementary channel formations 51 serve as mounting formations which permit the reel assembly 10 to be connected to one or more similar reel assemblies 10, in an arrangement wherein the reel assembly forms part of a reel set comprising three reel assemblies 10 connected to one another, as shown in FIG. 6A of the drawings.

In use, the connection of the reel assemblies 10 to one another adds to the weight and size of the reel assembly. The reel set thus provides greater resistance to pulling forces exerted on the fishing line by a user when unwinding fishing line from the spool 38, in use.

FIG. 6B shows the second housing part 16 of the reel assembly 10 connected to a first housing part of one of the reel assemblies of the reel set.

The Applicant believes that the reel assembly 10 is advantageous over other known storage reels for storing fishing line, as these known storage reels require a second person to assist the user by supporting the storage reel when unwinding fishing line from the storage reels. The Applicant envisages that when unwinding fishing line from the reel assembly 10 with the housing parts in the supporting configuration, the requirement for assistance from a second person when unwinding fishing line from the reel assembly 10, is obviated.

Also, the Applicant believes that the reel assembly 10 is advantageous as the handle 39 is removably mounted to the reel 10. As such, the user may have a number of reel assemblies without handles mounted thereto, which can be stacked together without interference from the handles.

Figure 2:
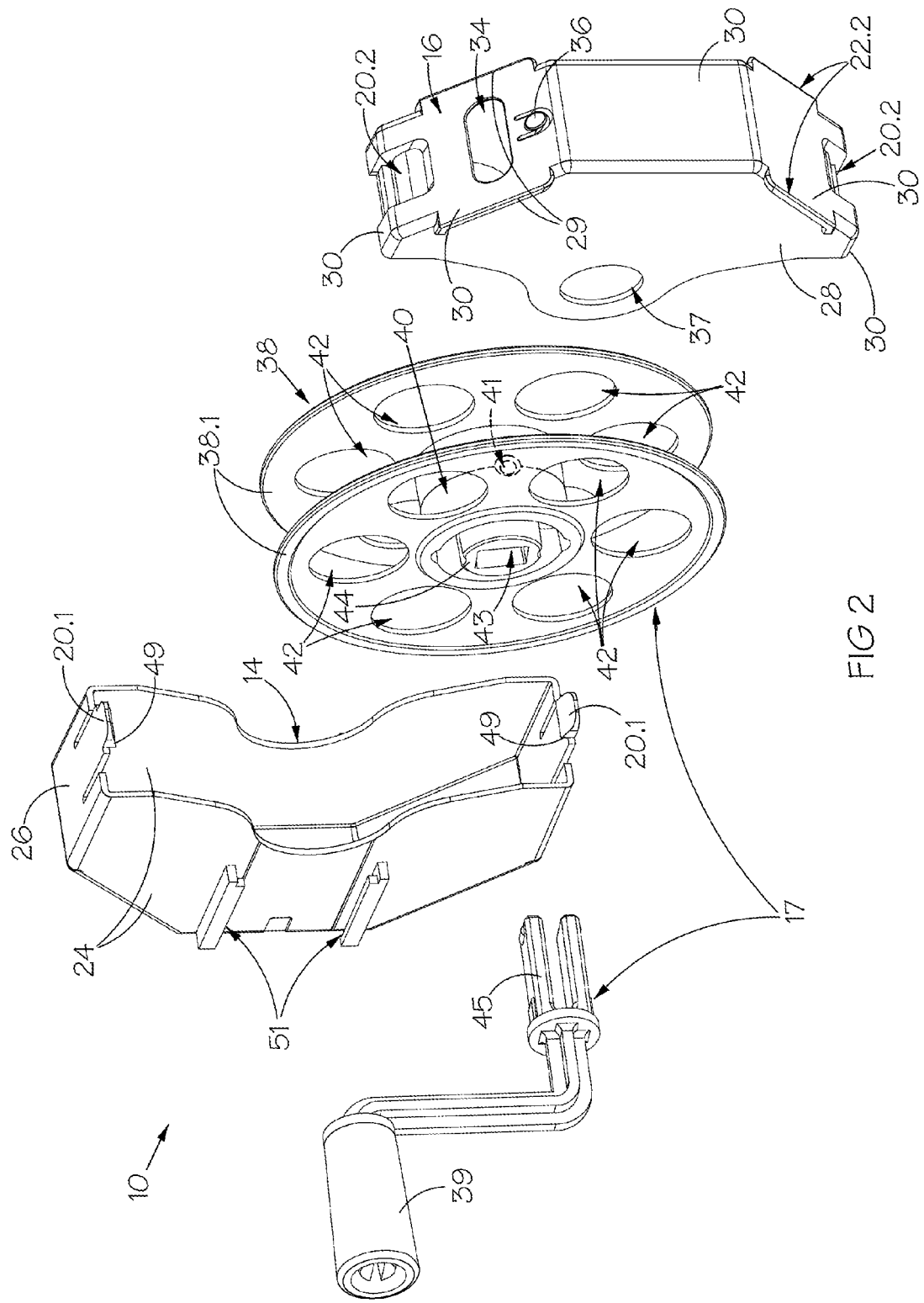
FIG. 2 shows an exploded perspective view of the reel assembly of FIG. 1.
Figure 3:
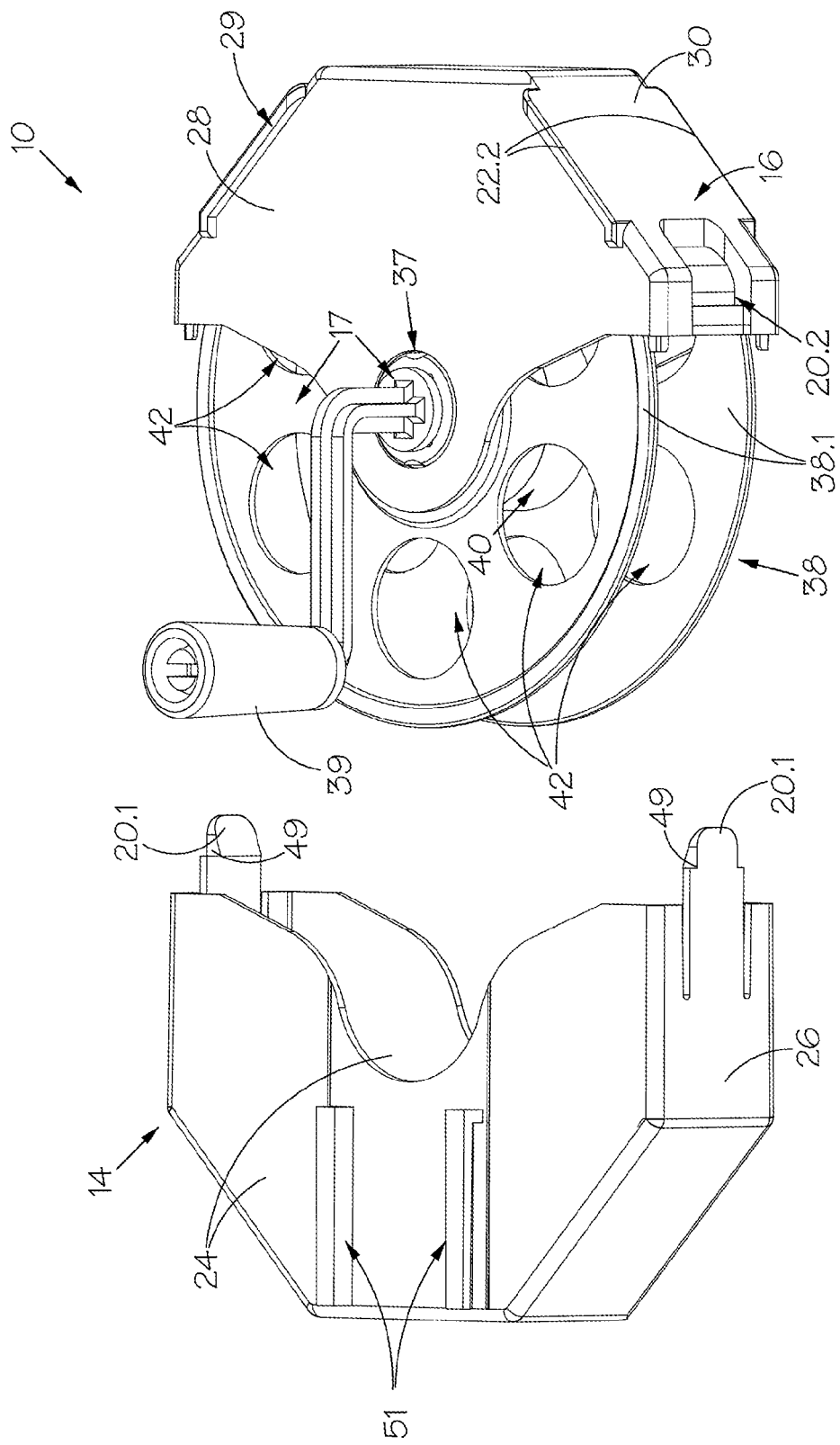
FIG. 3 shows a perspective view of the reel assembly of FIG. 1, shown with housing parts of the reel assembly separated from one another.

With reference to FIG. 2 of the drawings, the reel assembly includes releasable locking formations 49 defined on the ends of the tongue formations 20.1, 20.2 for releasable engagement with corresponding formations of the complementary slots 20.2, for relesably locking of the first housing part 14 and the second housing part 16 to one another.

Figure 7:
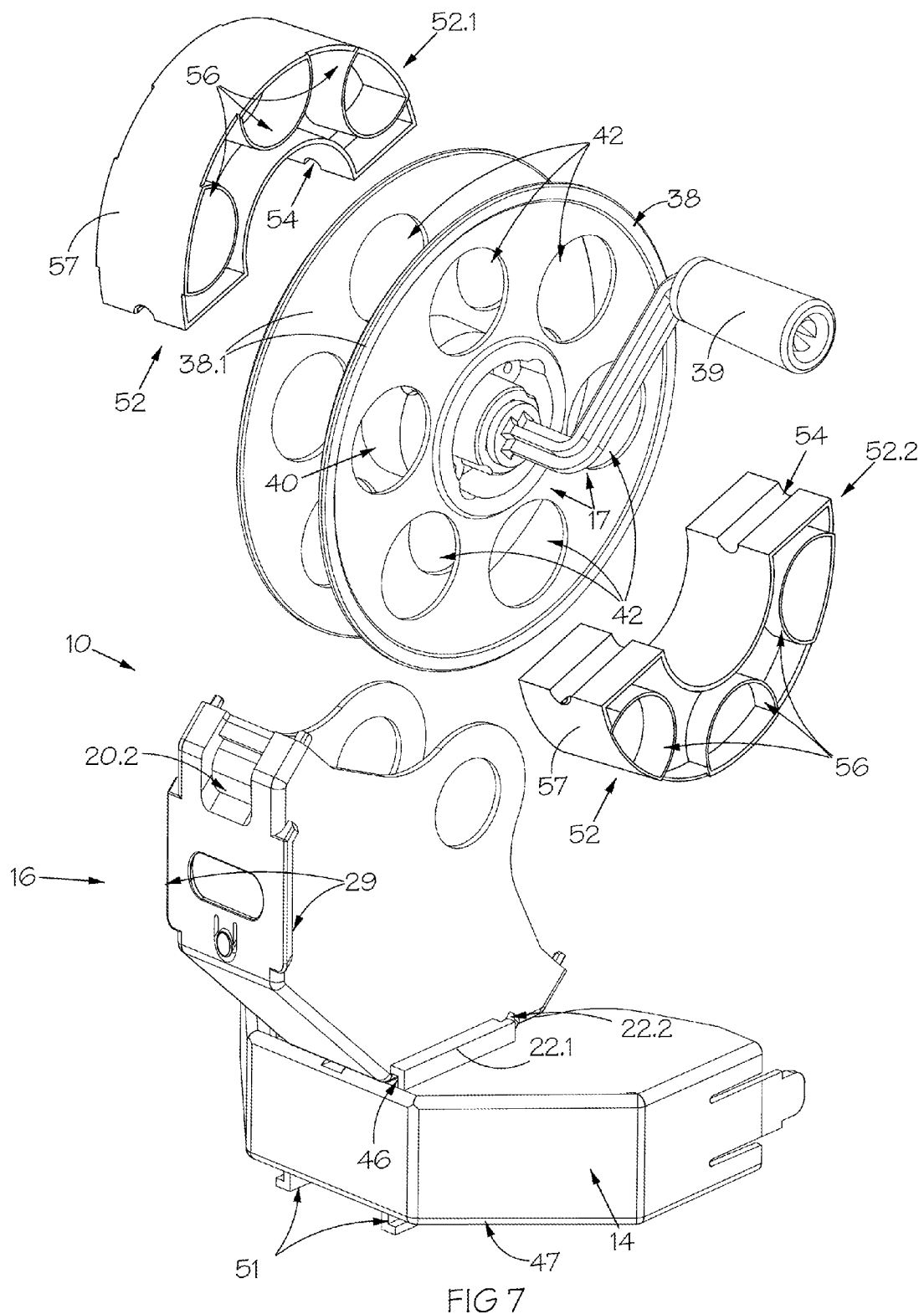
FIG. 7 shows a perspective exploded view of the reel assembly of FIG. 4, shown with a spacer adapter being mounted to the reel assembly of FIG. 4.
Figure 8:
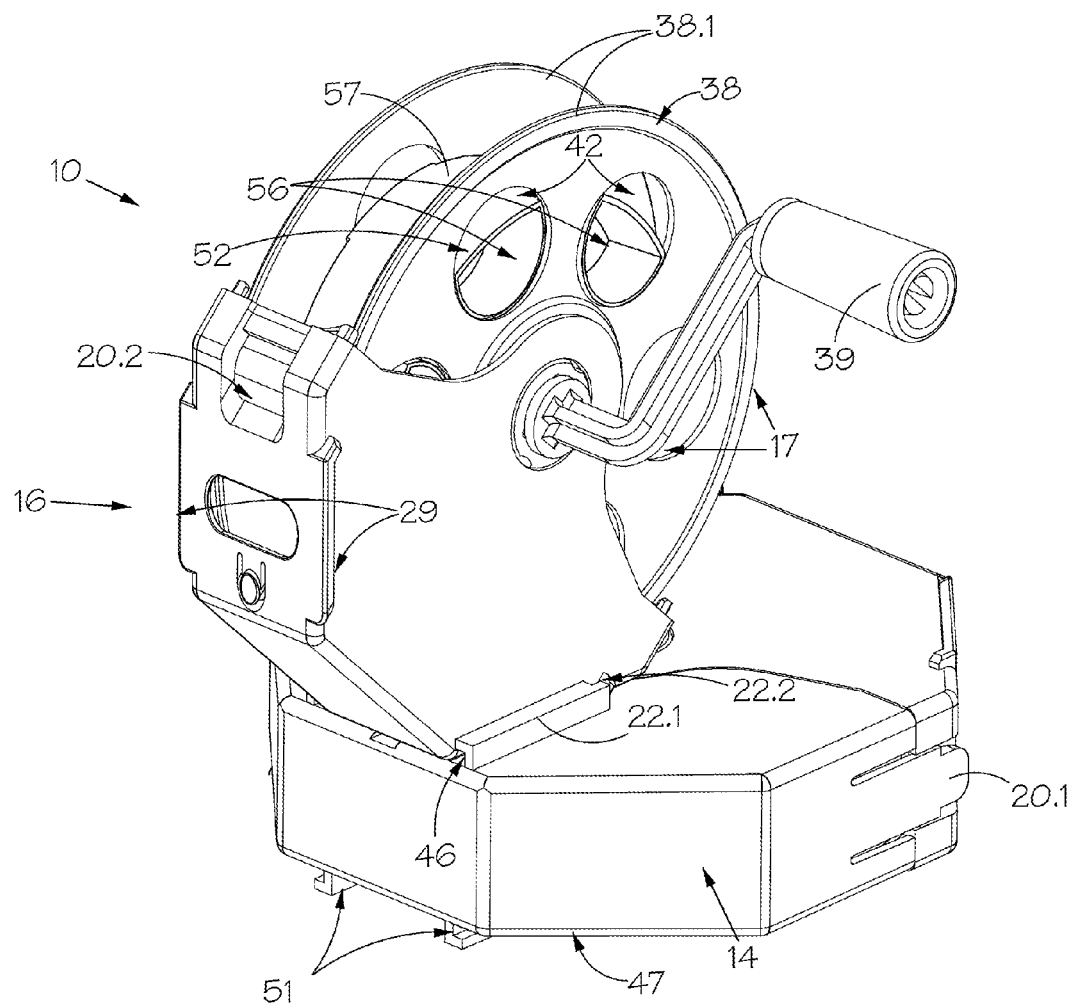
FIG. 8 shows a perspective view of the reel assembly of FIG. 7, shown after mounting of the spacer adapter to the reel assembly.

Referring to FIGS. 7 and 8 of the drawings, the reel assembly also includes a spacer adapter 52 which surrounds the drum 40 of the spool for increasing the effective diameter of the drum. The spacer adapter includes adapter parts in the form of collar halves 52.1 and 52.2 that are located around the drum 40. Each collar half has connecting formations in the form of half-cylindrical connecting formations 56. The connecting formations 56 are clipped into corresponding circumferentially spaced apertures 42 defined in walls 38.1 of the spool, as shown in FIG. 8 of the drawings, for releasably connecting the collar halves to the spool 38, as shown in FIG. 8 of the drawings.

The Applicant envisages that, in use, a number of different sized spacer adapters can be provided. This arrangement permits the user to select an appropriate sized spacer adapter to accommodate a particular length and/or thickness of fishing line. More specifically, it will be appreciated that a user will specifically use the spacer adapter 52 when the fishing line has a particularly short length, such that the spacer adapter 52 provide a cylindrical support 57 upon which the fishing line is wound, in use, for supporting the fishing line at positions spaced outwardly from the drum 40 of the spool, so as to speed up the winding and unwinding of the fishing line, when rotating the spool, in use. The Applicant has found that the spacer adapter is particularly advantageous because by increasing the effective diameter of the drum, the fishing line is less prone, when unwound, to retain a "memory", when compared to a "memory" retained when winding the fishing line onto the drum of the spool.

Figure 5:
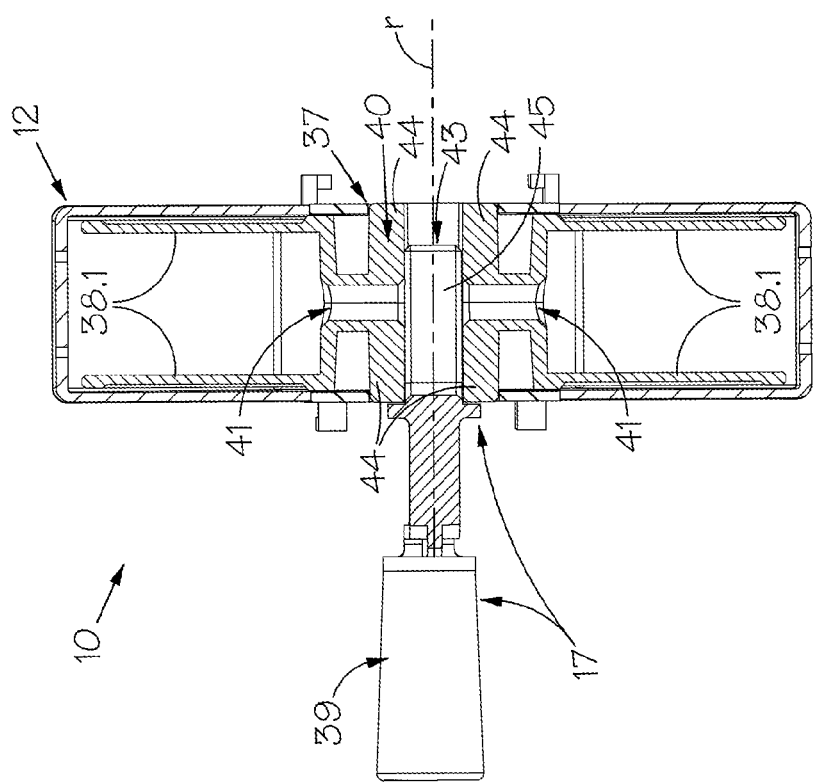
FIG. 5 shows a sectional view of the reel assembly of FIG. 1, sectioned along section lines V-V of FIG. 1.

The collar halves 52.1 and 52.2 include passage formations 54 which define cylindrical passages when the collar halves are connected to the walls 38.1 of the spool, which are aligned with the aperture 41 of the spool (which is shown in FIGS. 2 and 5 of the drawings).

The Applicant envisages in this regard that, in use, prior to winding the fishing line 8 onto the spacer adapter 52, an end of the fishing line will be passed through the passage defined by the passage formations 54 and through the aperture 41 defined through the spool 38. Furthermore, the Applicant envisages that the end of the fishing line will pass between the forks of the forked end 45 of the handle 39. As such, it will be appreciated that the handle 39 can be freely removed and separated from the spool 38, even after the fishing line 8 has been wound onto the spacer adapter and onto the spool 38.

Furthermore, it will also be appreciated that in a case wherein no spacer adapter 52 is releasably locked to the spool 38, such as in the case of the reel assembly 10 illustrated in FIGS. 1 to 6 of the drawings, the end of the fishing line will similarly be passed through the aperture 41 of the spool 38 prior to winding the fishing line onto the spool 38. The end of the fishing line will thus also pass between the forks of the forked end 45 of the handle 39. As such, the Applicant envisages that a user who has a number of reel assemblies 10, need only purchase a single handle 39, which can be easily removably mounted to the spool 38 of a selected one of the reel assemblies, as needed.

Figure 9:
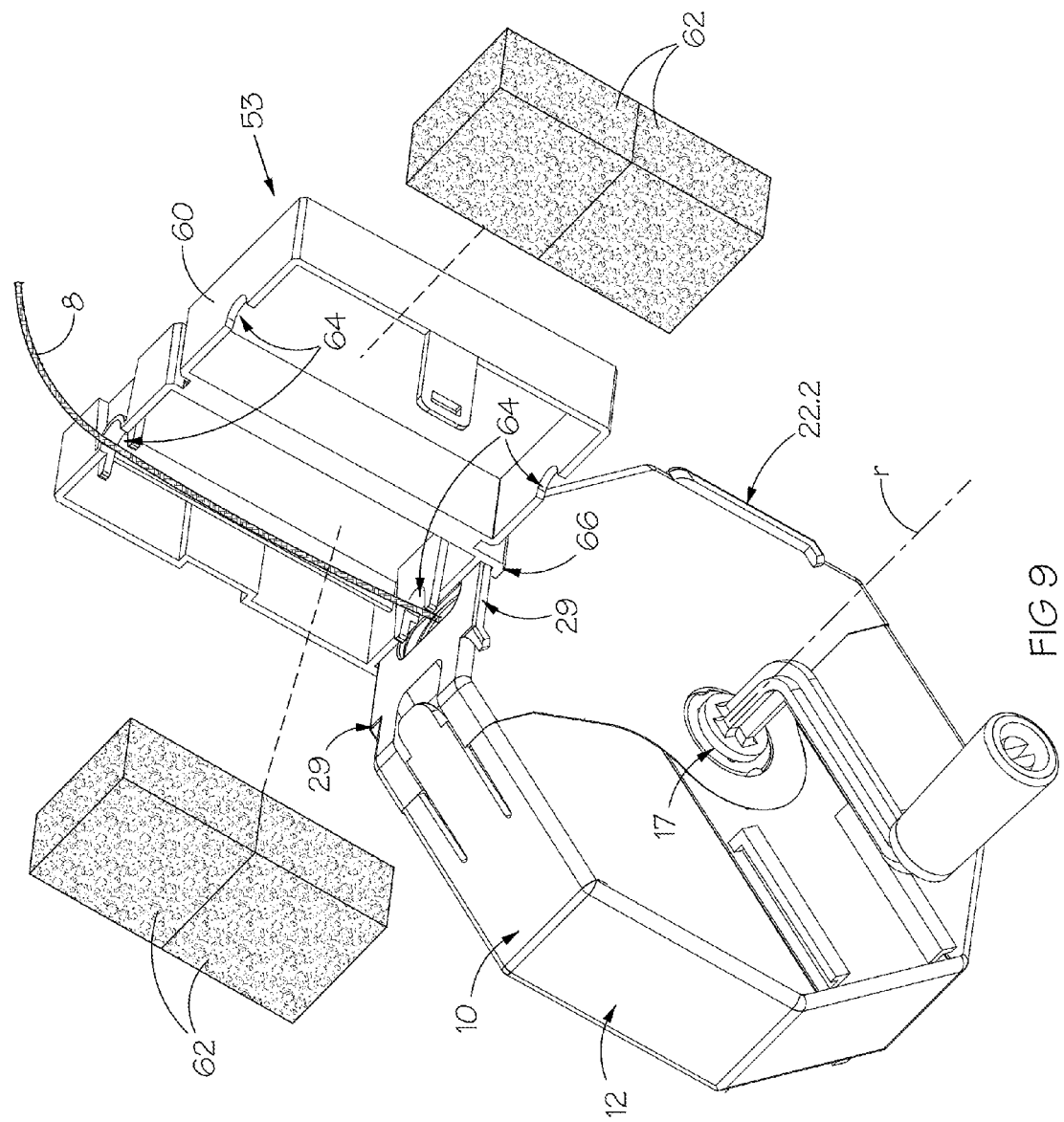
FIG. 9 shows a perspective view of cleaning means shown being releasably attached to one of the housing parts of the reel assembly of FIG. 1.
Figure 10:
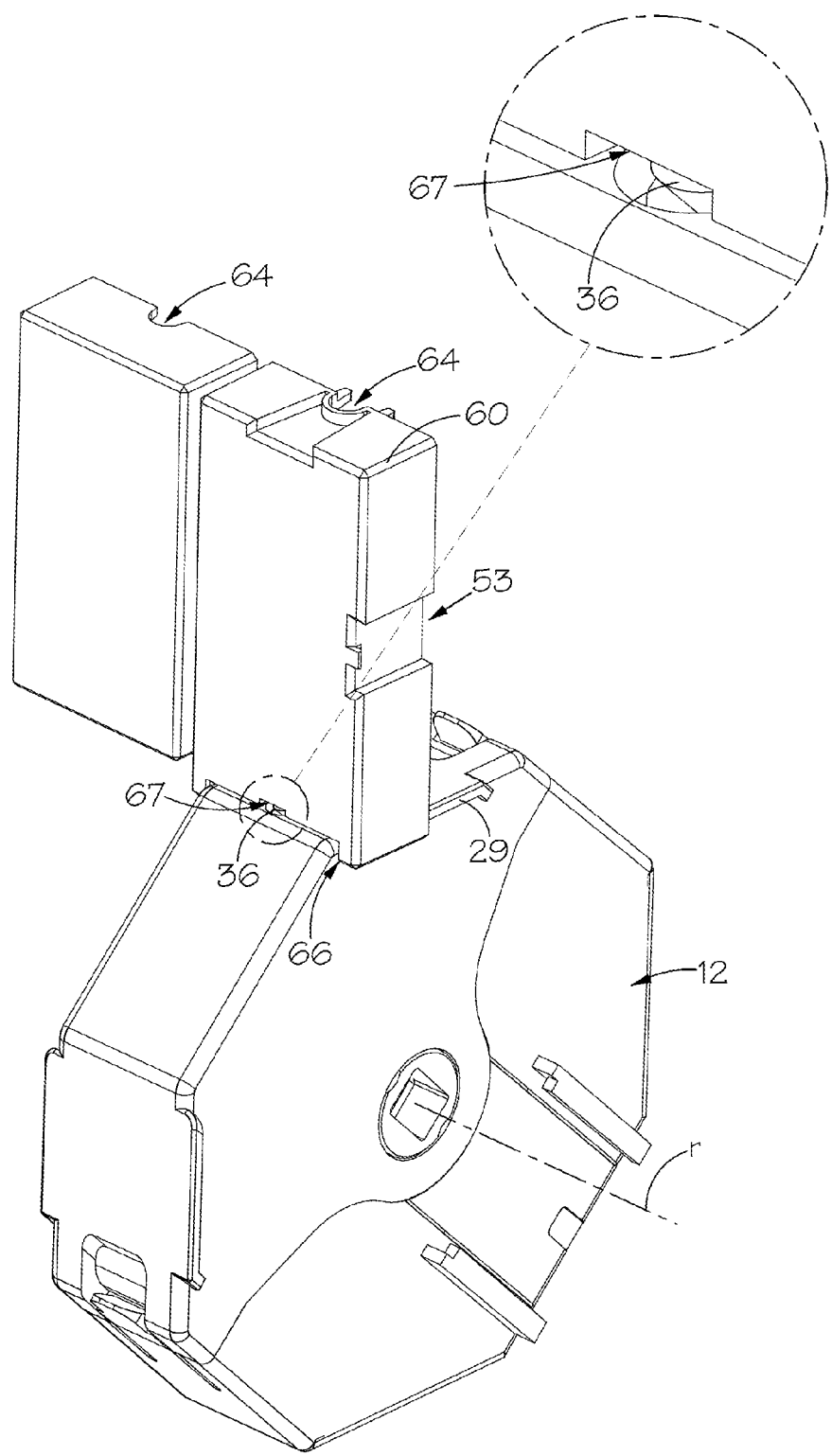
FIG. 10 shows a perspective opposite side view of the cleaning means and the reel assembly of FIG. 9.
Figure 11:
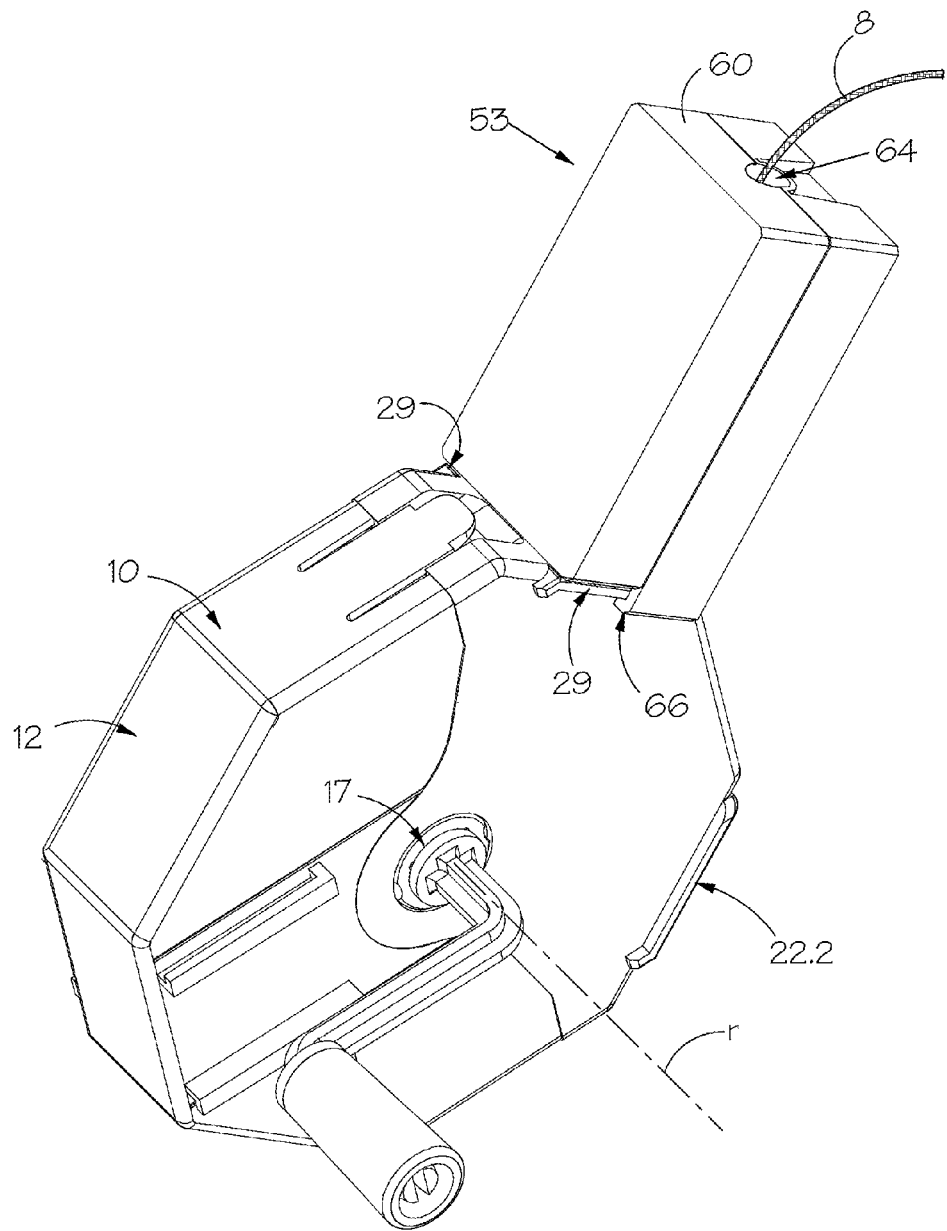
FIG. 11 shows a perspective view of the reel assembly of FIG. 9, illustrated in use.

With reference to FIGS. 9 to 11 of the drawings, the reel assembly further includes a cleaning box 53 which is releasably attachable to the housing and which includes an openable holder 60; cleaning elements 62 for cleaning the fishing line; and complementary releasable attaching formation 66 in the form of channel-shaped formations defined on the holder 60 and a central groove 67 defined on an underside of the holder 60, the purposes of which will be explained in more detail hereinbelow. The holder 60 defines an internal space therein for holding the cleaning elements 62. The holder 60 has apertures 64 extending through the holder 60 and defines a passage therethrough, for receiving the fishing line 8. The holder 60 and the cleaning elements 62 are configured such that when the fishing line is drawn through the passage of the holder 60 when winding the fishing line 8 onto the spool, in use, the fishing line 8 is brought into contact with the cleaning elements 62 for cleaning the fishing line 8.

The releasable attaching formations 29 and 36, of the housing 12 and the complementary releasable attaching formations 66 and 67 of the cleaning box 53, are configured to releasably attach the housing 12 and the cleaning box 53 to one another. More particularly, in use, the releasable attaching formations 29 of the second housing part 16 are slidingly received within the releasable attaching formations 66 of the holder 60, as shown in FIGS. 9 to 11 of the drawings, for releasably attaching the cleaning box 53 and the housing 12 to one another. As shown in FIG. 10 of the drawings, the releasable attaching formation 36 of the housing 12 is slidably received within the central groove 67 of the holder 60 of the cleaning box 53 and is depressed by the holder 60. When the holder 60 is slided to a position wherein the releasable attaching formation 36 passes out of the central groove 67, the releasable attaching formation 36, being of a flexible material, moves back to its "normal position" (which it occupied prior to being depressed). As such, the releasable attaching formation 36 is operable, in its normal position, to abut against the holder 60 so as to releasably hold the holder 60 in position, when the holder 60 and the housing are releasably attached to one another.

The Applicant envisages that the complementary releasable attaching formations 29, 36 of the housing 12 and the complementary releasable attaching formations 66, 67 of the cleaning box 53, are advantageous because the housing 12 with the cleaning box 53 attached thereto, can be held in one of a user's hands while the user rotates the handle 39 of the spool assembly 17 with the other hand.

After the fishing line has been wound onto the spool and is cleaned by the cleaning elements 62 of the cleaning box 53, the releasable attaching formations 29, 36 of the housing 12 and the complementary releasable attaching formations 66, 67 of the cleaning box 53 also permit the cleaning box 53 to be slidingly removed from releasable attachment to the housing 12 by sliding the cleaning box 53 away from the housing 12 in an opposite direction from the direction described hereinabove. More particularly, the holder is slided until the releasable attaching formation 36 is again depressed by the holder 60 and is slidingly received within the central groove 67 of the holder 60, the holder is then continuously slided until the cleaning box 53 and the housing are separated from one another.

It will be appreciated that the exact configuration of the reel assembly 10, in accordance with the invention, may vary greatly while still incorporating the essential features of the invention as hereinabove described.

The invention claimed is:

1. A reel assembly for storing fishing line including:
    a housing comprising a first housing part and a second housing part, wherein the housing parts each have a generally cup-shaped configuration and include a pair of opposite spaced apart major sides; and
    a spool rotatably mounted to the second housing part, the spool having a central support formation on which the fishing line can be wound, the spool defining an axis of rotation about which the spool is rotated for winding and unwinding the fishing line onto the spool, in use,
    the first housing part and the second housing part each having first and second complementary releasable connecting formations for releasably connecting the first housing part and the second housing part to one another in a selected one of two different configurations, whereby the housing parts are transformable between:

a housing configuration wherein the first housing part and the second housing part are releasably connected to one another by the first connecting formations of the housing parts in an arrangement wherein the housing parts substantially surround the spool; and a supporting configuration wherein the first housing part is releasably connected to an underside of the second housing part by the second connecting formations of the housing parts, in an arrangement wherein the first housing part provides a base for supporting the second housing part on a substrate surface, wherein the base of the first housing part is defined by one of the major sides of the first housing part.

2. A reel assembly as claimed in claim 1, wherein the reel assembly includes releasable locking means for releasably locking the housing parts to one another in the housing configuration.

3. A reel assembly as claimed in claim 1, wherein one of the first housing part and the second housing part includes an aperture defined therethrough, through which the fishing line passes, in use.

4. A reel assembly as claimed in claim 1, wherein the reel assembly has mounting means for mounting the housing to a housing of at least one similar reel assembly.

5. A reel assembly as claimed in claim 4, wherein the mounting means of the reel assembly is in the form of a pair of mounting formations, each mounting formation of the pair of mounting formations, being located on a different one of two opposite sides of the housing for mounting a different one of a pair of similar reel assemblies to opposite sides of the housing.

6. A reel assembly as claimed in claim 1, wherein the reel assembly includes cleaning means including at least one cleaning element for cleaning the fishing line; and a holder for holding the cleaning element, the holder being releasably attachable to the housing and having at least one passage extending therethrough for receiving the fishing line, the holder and the cleaning element being configured such that when the fishing line is drawn through the passage of the holder when winding the fishing line onto the spool, in use, the fishing line is brought into contact with the cleaning element for cleaning the fishing line.

7. A reel assembly as claimed in claim 1, wherein the reel assembly includes at least one spacer adapter which is releasably mountable to the spool, the spacer adapter providing a support structure which surrounds the central support formation of the spool and upon which the fishing line is wound, in use, for supporting the fishing line at positions spaced outwardly from the central support formation.

8. A reel assembly for storing fishing line including:

a housing comprising a first housing part and a second housing part; and a spool rotatably mounted to the second housing part, the spool having a central support formation on which the fishing line can be wound, the spool defining an axis of rotation about which the spool is rotated for winding and unwinding the fishing line onto the spool, in use, the first housing part and the second housing part each having first and second complementary releasable connecting formations for releasably connecting the first housing part and the second housing part to one another in a selected one of:

a housing configuration wherein the first housing part and the second housing part are releasably connected to one another by the first connecting formations of the housing parts in an arrangement wherein the housing parts substantially surround the spool; and a supporting configuration wherein the first housing part is releasably connected to an underside of the second housing part by the second connecting formations of the housing parts, in an arrangement wherein the first housing part provides a base for supporting the second housing part on a substrate surface;

wherein the reel assembly further includes cleaning means including at least one cleaning element for cleaning the fishing line; and a holder for holding the cleaning element, the holder being releasably attachable to the housing and having at least one passage extending therethrough for receiving the fishing line, the holder and the cleaning element being configured such that when the fishing line is drawn through the passage of the holder when winding the fishing line onto the spool, in use, the fishing line is brought into contact with the cleaning element for cleaning the fishing line.

9. A reel assembly for storing fishing line including:

a housing comprising a first housing part and a second housing part; and a spool rotatably mounted to the second housing part, the spool having a central support formation on which the fishing line can be wound, the spool defining an axis of rotation about which the spool is rotated for winding and unwinding the fishing line onto the spool, in use, the first housing part and the second housing part each having first and second complementary releasable connecting formations for releasably connecting the first housing part and the second housing part to one another in a selected one of:

a housing configuration wherein the first housing part and the second housing part are releasably connected to one another by the first connecting formations of the housing parts in an arrangement wherein the housing parts substantially surround the spool; and a supporting configuration wherein the first housing part is releasably connected to an underside of the second housing part by the second connecting formations of the housing parts, in an arrangement wherein the first housing part provides a base for supporting the second housing part on a substrate surface;

wherein the reel assembly further includes at least one spacer adapter which is releasably mountable to the spool, the spacer adapter providing a support structure which surrounds the central support formation of the spool and upon which the fishing line is wound, in use, for supporting the fishing line at positions spaced outwardly from the central support formation.

* * * * *